US012631842B2

(12) United States Patent (10) Patent No.: US 12,631,842 B2

Sato et al. (45) Date of Patent: May 19, 2026

(54) OPTICAL FIBER CABLE AND METHOD FOR MANUFACTURING OPTICAL FIBER CABLE

(71) Applicant: SUMITOMO ELECTRIC INDUSTRIES, LTD., Osaka (JP)

(72) Inventors: Fumiaki Sato, Osaka (JP); Kenta Tsuchiya, Osaka (JP); Eimi Kasai, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 204 days.

(21) Appl. No.: 18/688,113

(22) PCT Filed: Dec. 9, 2022

(86) PCT No.: PCT/JP2022/045453

§ 371 (c)(1),
(2) Date: Feb. 29, 2024

(87) PCT Pub. No.: WO2023/106398

PCT Pub. Date: Jun. 15, 2023

(65) Prior Publication Data

US 2024/0353639 A1 Oct. 24, 2024

(30) Foreign Application Priority Data

Dec. 10, 2021 (JP) ................................. 2021-201028

(51) Int. Cl.
G02B 6/44 (2006.01)
(52) U.S. Cl.
CPC ................................. G02B 6/4486 (2013.01)

(58) Field of Classification Search
CPC ... G02B 6/4434; G02B 6/4407; G02B 6/4436
USPC .......................... 385/100, 103, 105, 106, 109
See application file for complete search history.

(56) References Cited

U.S. PATENT DOCUMENTS

| | | | | |
|---|---|---|---|---|
| 4,038,489 A | * | 7/1977 | Stenson | G02B 6/4459 385/113 |
| 4,707,074 A | * | 11/1987 | Heywood | G02B 6/4431 385/113 |
| 4,745,238 A | * | 5/1988 | Kotthaus | H01B 7/12 174/101.5 |
| 6,195,486 B1 | * | 2/2001 | Field | G02B 6/44384 385/103 |

(Continued)

FOREIGN PATENT DOCUMENTS

| | | |
|---|---|---|
| CN | 211263880 U | 8/2020 |
| CN | 213182149 U | 5/2021 |

(Continued)

OTHER PUBLICATIONS

International Search Report dated Feb. 28, 2023 issued in PCT/JP2022/045453.
Written Opinion dated Feb. 28, 2023 issued in PCT/JP2022/045453.

*Primary Examiner* — Robert Tavlykaev
(74) *Attorney, Agent, or Firm* — McDonald Hopkins LLC

(57) ABSTRACT

An optical fiber cable includes: a spacer including a plurality of ribs and a plurality of grooves defined by the plurality of ribs; a plurality of optical fiber units accommodated in each of the plurality of grooves; and a cable sheath configured to cover the spacer and the plurality of optical fiber units. The spacer and the cable sheath are integrally formed.

6 Claims, 2 Drawing Sheets

(56)                    References Cited

U.S. PATENT DOCUMENTS

| | | | | |
|---|---|---|---|---|
| 8,768,127 | B1 * | 7/2014 | Burnett | .................. G02B 6/441 |
| | | | | 385/110 |
| 10,204,720 | B2 | 2/2019 | Glew | |
| 2020/0064550 | A1 * | 2/2020 | Sato | ....................... G02B 6/262 |
| 2020/0219638 | A1 * | 7/2020 | Williams | ............... H01B 7/425 |
| 2020/0225432 | A1 * | 7/2020 | Ishikawa | ............. G02B 6/4408 |
| 2023/0273381 | A1 * | 8/2023 | Kaneko | ............. G02B 6/02395 |
| | | | | 385/100 |

FOREIGN PATENT DOCUMENTS

| | | | | | |
|---|---|---|---|---|---|
| JP | | 2012-088359 | A | 5/2012 | |
| JP | | 2019-056837 | A | 4/2019 | |
| JP | WO | 2019/142841 | A1 * | 7/2019 | .............. G02B 6/44 |
| JP | | 2020-091397 | A | 6/2020 | |

* cited by examiner

OPTICAL FIBER CABLE AND METHOD FOR MANUFACTURING OPTICAL FIBER CABLE

The present application claims priority based on Japanese Application No. 2021-201028 filed on Dec. 10, 2021, and incorporates all the contents described in the Japanese Application.

TECHNICAL FIELD

The present disclosure relates to an optical fiber cable and a method for manufacturing an optical fiber cable.

BACKGROUND ART

Patent Literature 1 discloses an optical fiber cable on which a plurality of optical fibers are mounted. The optical fiber cable is provided with a spacer including eight ribs. Grooves are defined by adjacent ribs, and a plurality of optical fibers are mounted in each of a plurality of grooves.

CITATION LIST

Patent Literature

Patent Literature 1: JP2020-091397A

SUMMARY OF INVENTION

An object of the present disclosure is to provide an optical fiber cable capable of preventing an increase in transmission loss of an optical fiber and a method for manufacturing the same.

Solution to Problem

An optical fiber cable according to an aspect of the present disclosure includes:
- a spacer including a plurality of ribs and a plurality of grooves defined by the plurality of ribs;
- a plurality of optical fibers accommodated in each of the plurality of grooves; and
- a cable sheath configured to cover the spacer and the plurality of optical fibers.
The spacer and the cable sheath are integrally formed.

A method for manufacturing an optical fiber cable according to an aspect of the present disclosure includes a step of simultaneously and integrally forming the cable sheath and the spacer by an extruder.

DESCRIPTION OF EMBODIMENTS

Figure 1:
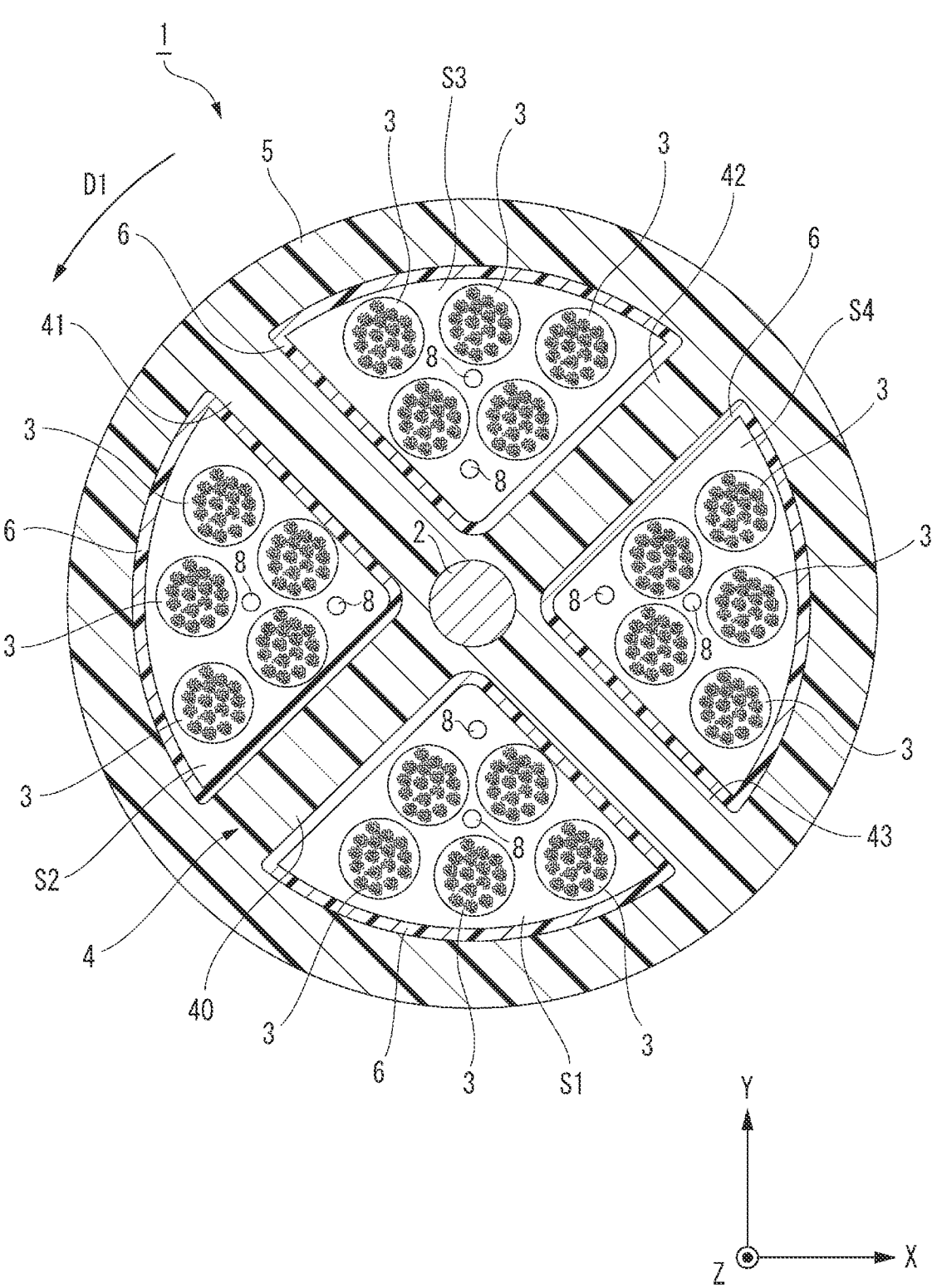
FIG. 1 is a cross-sectional view showing an optical fiber cable according to an embodiment of the present disclosure.

Problem to be Solved by Present Disclosure

In the optical fiber cable disclosed in Patent Literature 1, the rib of the spacer may fall down through the manufacturing process (particularly, the manufacturing process of the spacer) of the optical fiber cable. In such a case, the mounting areas (hereinafter, the fiber mounting areas) of the optical fiber are varied in the grooves of the spacer. In particular, in the situation in which the ribs fall down, the fiber mounting area of several grooves is reduced as compared with the situation in which the ribs do not fall down. As a result, in the groove in which the fiber mounting area is reduced, the mounting density of the optical fibers becomes excessively high, and adjacent optical fibers press against each other, resulting in an increase in transmission loss of the optical fibers. As described above, there is room for consideration of a new structure of the optical fiber cable capable of preventing an increase in transmission loss of the optical fiber caused by the rib falling down.

First, the contents of an embodiment of the present disclosure will be listed and described.

(1) An optical fiber cable including:
- a spacer including a plurality of ribs and a plurality of grooves defined by the plurality of ribs;
- a plurality of optical fibers accommodated in each of the plurality of grooves; and
- a cable sheath configured to cover the spacer and the plurality of optical fibers,
- in which the spacer and the cable sheath are integrally formed.

According to the above configuration, since the spacer and the cable sheath are integrally formed, it is possible to suitably prevent the ribs of the spacer from falling down through the manufacturing process of the optical fiber cable. Therefore, it is possible to provide an optical fiber cable capable of suitably preventing a variation in the fiber mounting area and preventing an increase in transmission loss of the optical fiber.

(2) The optical fiber cable according to item (1),
- in which the spacer and the cable sheath are made of the same material.

According to the above configuration, since the spacer and the cable sheath are made of the same material, the spacer and the cable sheath can be integrally formed by the mold of the extruder, and the number of steps in the manufacturing process of the optical fiber cable can be reduced.

(3) The optical fiber cable according to item (2),
- in which the spacer and the cable sheath are made of flame-retardant polyethylene.

According to the above configuration, since both the spacer and the cable sheath are made of flame-retardant polyethylene, it is possible to improve the flame retardance of the entire optical fiber cable.

(4) The optical fiber cable according to any one of items (1) to (3),
- in which a plurality of optical fiber ribbons are accommodated in each of the plurality of grooves,
- in which each of the plurality of optical fiber ribbons is implemented by the plurality of optical fibers arranged in parallel, and
- in which at least some of adjacent optical fibers among the plurality of optical fibers are intermittently bonded along an axial direction of the plurality of optical fibers.

In the optical fiber ribbon accommodated in each groove, at least some of the adjacent optical fibers are intermittently bonded along the axial direction. Therefore, the optical fiber is easily handled when the optical fiber is taken out from the optical fiber cable. The optical fibers can be accommodated at a high density in each of the grooves.

(5) The optical fiber cable according to any one of items (1) to (4),
- in which the number of the plurality of ribs is four or less.

According to the above configuration, since the fiber mounting area in the optical fiber cable increases, more optical fibers can be mounted in the optical fiber cable. Further, since the number of grooves of the spacer is four or less, the plurality of optical fibers are easily accommodated in each groove of the spacer.

(6) A method for manufacturing the optical fiber cable according to any one of items (1) to (5), the method including a step of simultaneously and integrally forming the cable sheath and the spacer by an extruder.

According to the above method, since the cable sheath and the spacer are formed by the extruder in the same process, the number of steps in the manufacturing process of the optical fiber cable can be reduced. Further, in the optical fiber cable manufactured by the above method, since the rib on the spacer is suitably prevented from falling down, an increase in transmission loss of the optical fiber cable mounted in the optical fiber cable can be prevented.

Effects of Present Disclosure

According to the present disclosure, it is possible to provide an optical fiber cable capable of preventing an increase in transmission loss of an optical fiber and a method for manufacturing the same.

Description of Embodiments of Present Disclosure

Hereinafter, an optical fiber cable 1 according to an embodiment (hereinafter referred to as the present embodiment) of the present disclosure will be described with reference to FIG. 1. The dimensions of the members shown in the drawings are for convenience of description and may be different from actual dimensions of the members. In the present embodiment, an X axis direction, a Y axis direction, and a Z axis direction set for the optical fiber cable 1 shown in FIG. 1 will be appropriately referred to. Each of the X axis direction, the Y axis direction, and the Z axis direction is perpendicular to the remaining two directions. For example, the X axis direction is perpendicular to the Y axis direction and the Z axis direction. The Z axis direction corresponds to the longitudinal direction (the axial direction) of the optical fiber cable 1.

FIG. 1 is a cross-sectional view showing the optical fiber cable 1 according to the present embodiment. The cross section of the optical fiber cable 1 shown in FIG. 1 is a cross section perpendicular to the Z axis direction of the optical fiber cable 1. As shown in FIG. 1, the optical fiber cable 1 includes a tension member 2, a spacer 4, a plurality of optical fiber units 3, a water absorption tape 6, and a cable sheath 5.

The tension member 2 is made of a tensile strength material that has resistance against tension and compression. Specifically, the tension member 2 may be made of a fiber reinforced plastic (FRP) such as aramid FRP, glass FRP or carbon FRP, or a metal material such as copper wire. The tension member 2 is embedded in the spacer 4 and is located at the center of the spacer 4.

The spacer 4 includes four ribs 40 to 43 and four grooves S1 to S4 defined by the ribs 40 to 43. The spacer 4 is formed in a cross shape in the cross section shown in FIG. 1. The grooves S1 are defined by the ribs 40 and 43 adjacent to each other. The grooves S2 are defined by the ribs 40 and 41 adjacent to each other. The grooves S3 are defined by the ribs 41 and 42 adjacent to each other. The grooves S4 are defined by the ribs 42 and 43 adjacent to each other. Each of the ribs 40 to 43 is formed integrally with the cable sheath 5, and the ribs 40 to 43 are supported by the cable sheath 5. Therefore, the ribs 40 to 43 extend straight from the tension member 2 toward the cable sheath 5 in the radial direction of the optical fiber cable 1. That is, each of the ribs 40 to 43 does not fall down. More specifically, each of the distal ends of the ribs 40 to 43 facing the cable sheath 5 does not fall down toward a circumferential direction D1 of the optical fiber cable 1.

The ribs 40 to 43 are arranged at intervals of 90° along the circumferential direction D1. The ribs 40 and 42 face each other and are arranged on the same straight line. The ribs 41 and 43 face each other and are arranged on the same straight line. The ribs 40 and 42 are orthogonal to the ribs 41 and 43. The spacer 4 is made of a flame-retardant resin material (for example, flame-retardant polyethylene).

The grooves S1 to S4 are spirally twisted along the Z axis direction of the spacer 4. As the type of the twist of each of the grooves S1 to S4, the S twist, the Z twist, or the SZ twist in which the S twist and the Z twist are alternately performed may be used. Since the grooves S1 to S4 are spirally twisted along the Z axis direction of the spacer 4, the optical fiber unit 3 accommodated in each of the grooves S1 to S4 is also spirally twisted along the Z axis direction. In this way, since the optical fiber unit 3 is spirally twisted along the Z axis direction, when the optical fiber cable 1 is bent, the bending loss of the optical fiber provided in the optical fiber unit 3 can be sufficiently reduced.

In the present embodiment, since the ribs 40 to 43 do not fall down, the cross-sectional areas of the grooves S1 to S4 are substantially the same. Therefore, in the grooves S1 to S4, the mounting areas (hereinafter, the fiber mounting areas) of the optical fiber do not vary.

Figure 2:
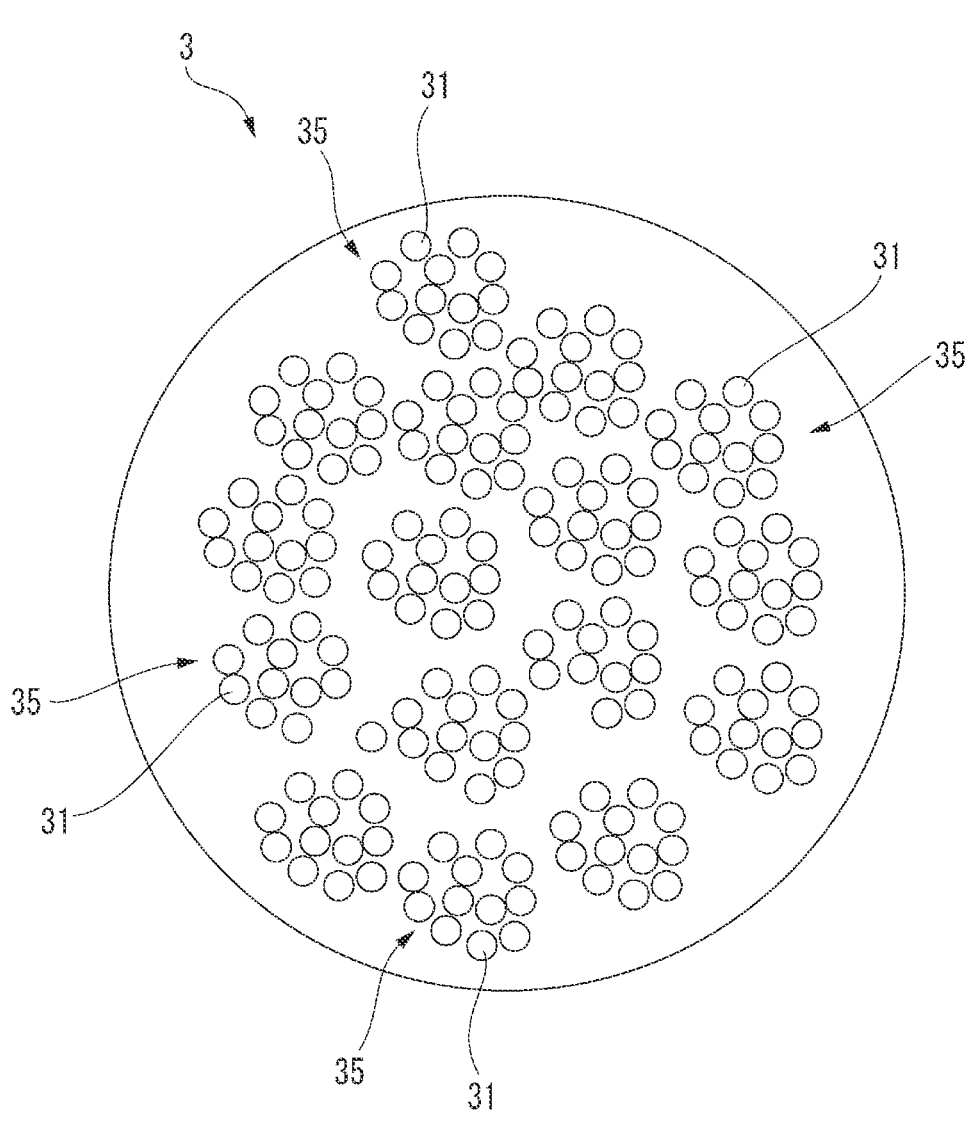
FIG. 2 is a cross-sectional view showing an optical fiber unit.
Figure 2:
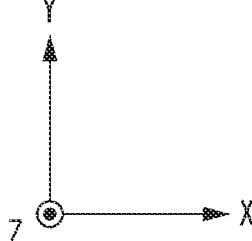

The plurality of optical fiber units 3 are accommodated in the grooves S1 to S4. As shown in FIG. 2, each optical fiber unit 3 includes a plurality of (for example, 12) optical fiber ribbons 35. Each optical fiber ribbon 35 includes a plurality of the optical fibers 31 arranged in parallel. The optical fiber 31 includes a glass fiber and a resin coating covering the glass fiber. The glass fiber includes at least one core through which the signal light propagates, and a cladding covering the core. The refractive index of the core is larger than the refractive index of the cladding. In FIGS. 1 and 2, a solid line indicating the optical fiber unit 3 indicates a group of the plurality of optical fiber ribbons 35. The optical fiber unit 3 may be implemented only by the plurality of optical fiber ribbons 35 twisted together. The optical fiber unit 3 may be implemented by the plurality of optical fiber ribbons 35 and a tube or a tape covering the plurality of optical fiber ribbons 35.

The optical fiber ribbon 35 may be, for example, an intermittently bonded optical fiber ribbon in which at least some of the adjacent optical fibers among the plurality of optical fibers 31 arranged in parallel are intermittently bonded along the axial direction (the Z axis direction). In other words, in the intermittently bonded optical fiber ribbon, all the adjacent optical fibers 31 may be intermittently bonded, or a part of all the adjacent optical fibers 31 may be intermittently bonded. In each optical fiber unit 3, the plurality of optical fiber ribbons 35 may be spirally twisted along the axial direction. The intermittently bonded optical fiber ribbon may be manufactured by any method as long as the optical fibers 31 adjacent to each other along the axial direction are intermittently bonded.

When each optical fiber unit 3 includes a plurality of the intermittently bonded optical fiber ribbons, the optical fiber 31 is easily handled when the optical fiber 31 is taken out from the optical fiber cable 1. Further, the optical fibers 31 can be accommodated at a high density in each of the grooves S1 to S4. In this example, the plurality of optical fiber ribbons 35 are provided in each optical fiber unit 3. Alternatively, each optical fiber unit 3 may include the plurality of single-core optical fibers 31 instead of the plurality of optical fiber ribbons 35.

As shown in FIG. 1, each of the grooves S1 to S4 is provided with a plurality of (in this example, two) water absorption yarns 8 and water absorption tapes 6. The water absorption tape 6 is provided in each of the grooves S1 to S4 in a manner of covering the plurality of optical fiber units 3 and the water absorption yarn 8. The water absorption tape 6 is longitudinally wrapped around the bundle of the plurality of optical fiber units 3, for example. The water absorption tape 6 is, for example, a tape subjected to water absorption processing by applying a water absorption powder to a base fabric made of polyester or the like.

The cable sheath 5 covers the spacer 4 and the plurality of optical fiber units 3. The cable sheath 5 functions as a protective layer that provides weather resistance, heat resistance, and water resistance to the optical fiber cable 1. The cable sheath 5 is formed integrally with the spacer 4. In this regard, the cable sheath 5 and the spacer 4 are simultaneously and integrally formed by extrusion molding using an extruder. The cable sheath 5 is made of the same material (for example, flame-retardant resin such as flame-retardant polyethylene) as the spacer 4.

In the manufacturing process of the optical fiber cable 1, for example, four cable cores each including the plurality of optical fiber units 3, the water absorption yarn 8, and the water absorption tape 6 are first prepared. Next, the four cable cores and the tension member 2 are inserted into the extruder. Thereafter, the cable sheath 5 and the spacer 4 are simultaneously formed by extrusion molding using a mold (die) of the extruder. Here, the cross-sectional shape of the hollow portion of the mold provided in the extruder coincides with the combination of the cross-sectional shape of the spacer 4 and the cross-sectional shape of the cable sheath 5.

According to the present embodiment, since the spacer 4 and the cable sheath 5 are integrally formed, it is possible to suitably prevent the ribs 40 to 43 of the spacer 4 from falling down through the manufacturing process of the optical fiber cable 1. Therefore, since the cross-sectional area of each of the grooves S1 to S4 is substantially constant, variations in the fiber mounting area in the grooves S1 to S4 are suitably prevented.

In this regard, in the situation in which the ribs 40 to 43 fall down, the fiber mounting area of several grooves is reduced as compared with the situation in which the ribs 40 to 43 do not fall down. For example, when the rib 42 falls down counterclockwise in the circumferential direction D1, the fiber mounting area of the groove S3 is smaller than the fiber mounting area of the groove S4. Therefore, as a result of an excessively high mounting density of the optical fibers 31 accommodated in the groove in which the fiber mounting area is reduced, the transmission loss of the optical fiber 31 accommodated in the groove increases. On the other hand, the optical fiber cable 1 according to the present embodiment can suitably prevent such a situation. In this way, it is possible to provide the optical fiber cable 1 capable of preventing an increase in transmission loss of the optical fiber 31.

In the present embodiment, since the spacer 4 and the cable sheath 5 are simultaneously formed by the extruder, the spacer 4 and the cable sheath 5 are made of the same material. In particular, when the spacer 4 and the cable sheath 5 are made of flame-retardant polyethylene, it is possible to improve the flame retardance of the entire optical fiber cable 1.

In the example of the optical fiber cable 1 shown in FIG. 1, the number of ribs provided on the spacer 4 is four, and the number of ribs is not particularly limited. In this regard, the number of ribs provided on the spacer 4 is preferably four or less. When the number of ribs is four or less, the fiber mounting area in the optical fiber cable 1 is large. Therefore, it becomes possible to mount more optical fiber units 3 (or optical fibers 31) within the optical fiber cable 1. The plurality of optical fiber units 3 are easily accommodated in the grooves of the spacer 4.

In the manufacturing process of the optical fiber cable 1, since the spacer 4 and the cable sheath 5 are formed by the extruder in the same process, the number of steps in the manufacturing process of the optical fiber cable 1 can be reduced. Further, since the spacer 4 and the cable sheath 5 are integrally formed by the extruder, the rib on the spacer 4 is suitably prevented from falling down. As a result, an increase in transmission loss of the optical fiber 31 mounted in the optical fiber cable 1 can be prevented.

Although the present embodiment has been described above, it goes without saying that the technical scope of the present invention should not be interpreted to be limited by the description of the embodiment. The present embodiment is merely an example, and it is understood by those skilled in the art that various modifications to the present embodiment can be made within the scope of the invention described in the claims. In this way, the technical scope of the present invention should be defined based on the scope of the invention described in the claims and the scope of equivalents thereof.

REFERENCE SIGNS LIST

1: optical fiber cable
2: tension member
3: optical fiber unit
4: spacer
5: cable sheath
6: water absorption tape
8: water absorption yarn
31: optical fiber
35: optical fiber ribbon
40 to 43: rib
S1 to S4: groove
D1: circumferential direction

What is claimed is:

1. An optical fiber cable comprising:
a spacer including a plurality of ribs and a plurality of grooves defined by the plurality of ribs;
a plurality of optical fibers accommodated in each of the plurality of grooves;
a cable sheath configured to cover the spacer and the plurality of optical fibers; and
a water absorption tape that lines inner surfaces of the grooves and an inner surface of the cable sheath and thereby surrounds an interior space delimited by the inner surfaces of the grooves and the inner surface of the cable sheath,
wherein the spacer and the cable sheath are integrally formed.

2. The optical fiber cable according to claim 1, wherein the spacer and the cable sheath are made of the same material.

3. The optical fiber cable according to claim 2, wherein the spacer and the cable sheath are made of flame-retardant polyethylene.

4. The optical fiber cable according to claim 1, wherein a plurality of optical fiber ribbons are accommodated in each of the plurality of grooves, wherein each of the plurality of optical fiber ribbons is implemented by the plurality of optical fibers arranged in parallel, and wherein at least some of adjacent optical fibers among the plurality of optical fibers are intermittently bonded along an axial direction of the plurality of optical fibers.

5. The optical fiber cable according to claim 1, wherein the number of the plurality of ribs is four or less.

6. A method for manufacturing the optical fiber cable according to claim 1, the method comprising a step of simultaneously and integrally forming the cable sheath and the spacer by an extruder.

\* \* \* \* \*